US011090975B2

United States Patent
Snyder

(10) Patent No.: US 11,090,975 B2
(45) Date of Patent: Aug. 17, 2021

(54) COMPOSITE WHEEL RIM PREFORM AND METHOD OF FABRICATING A COMPOSITE WHEEL RIM PREFORM

(71) Applicant: Lacks Wheel Trim Systems, LLC, Grand Rapids, MI (US)

(72) Inventor: Colin S. Snyder, Lenexa, KS (US)

(73) Assignee: LACKS WHEEL TRIM SYSTEMS, LLC, Grand Rapids, MI (US)

( * ) Notice: Subject to any disclaimer, the term of this patent is extended or adjusted under 35 U.S.C. 154(b) by 0 days.

(21) Appl. No.: 16/042,341

(22) Filed: Jul. 23, 2018

(65) Prior Publication Data

US 2018/0326781 A1    Nov. 15, 2018

Related U.S. Application Data

(62) Division of application No. 15/131,917, filed on Apr. 18, 2016, now Pat. No. 10,029,512.
(Continued)

(51) Int. Cl.
*B60B 5/02*    (2006.01)
*B60B 21/02*    (2006.01)
(Continued)

(52) U.S. Cl.
CPC ............ *B60B 21/023* (2013.01); *B29B 11/16* (2013.01); *B29C 70/00* (2013.01); *B32B 3/26* (2013.01);
(Continued)

(58) Field of Classification Search
CPC ...... B60B 2360/34–362; B60B 21/023; B60B 21/102; B60B 21/104; B60B 2310/211;
(Continued)

(56) References Cited

U.S. PATENT DOCUMENTS 4,376,749 A    3/1983  Woelfel
4,749,235 A    6/1988  McDougall
(Continued)

FOREIGN PATENT DOCUMENTS

WO    WO9617120    6/1996

OTHER PUBLICATIONS

International Search Report and Written Opinion of PCT/US2016/028137 dated Aug. 1, 2016.

*Primary Examiner* — Jun S Yoo
(74) *Attorney, Agent, or Firm* — Dickinson Wright, PLLC

(57) ABSTRACT

A preform for fabricating a wheel rim and a method of making a preform is provided. The preform includes a main section and at least one secondary section, each section being formed from composite materials, such as triaxially braided composite material that includes fibers oriented in at least three directions. The main section forms at least part of a lateral section of the preform and the secondary section forms at least part of a radial portion of the preform, the radial portion of the preform being generally perpendicular to the lateral section of the preform. The preform is fabricated from a plurality of composite layers, at least some being custom composite layers having a plurality of axial fibers interwoven intermittently with substantially consistent first and second sets of biased fibers. In some embodiments, the preform is initially fabricated in an intermediate configuration prior to being moved to a final configuration.

13 Claims, 5 Drawing Sheets

Related U.S. Application Data

(60) Provisional application No. 62/149,084, filed on Apr. 17, 2015.

(51) Int. Cl.
| | | |
|---|---|---|
| *B29C 70/00* | (2006.01) | |
| *B29B 11/16* | (2006.01) | |
| *B60B 3/16* | (2006.01) | |
| *B32B 3/26* | (2006.01) | |
| *B32B 5/02* | (2006.01) | |
| *B32B 5/06* | (2006.01) | |
| *B32B 5/26* | (2006.01) | |
| *B32B 37/16* | (2006.01) | |
| *B32B 38/00* | (2006.01) | |
| *B60B 21/10* | (2006.01) | |

(52) U.S. Cl.
CPC .............. *B32B 5/024* (2013.01); *B32B 5/06* (2013.01); *B32B 5/26* (2013.01); *B32B 37/16* (2013.01); *B32B 38/0012* (2013.01); *B60B 3/16* (2013.01); *B60B 5/02* (2013.01); *B60B 21/102* (2013.01); *B60B 21/104* (2013.01); *B32B 2305/188* (2013.01); *B32B 2307/52* (2013.01); *B32B 2605/00* (2013.01); *B60B 2310/211* (2013.01); *B60B 2310/241* (2013.01); *B60B 2310/242* (2013.01); *B60B 2360/10* (2013.01); *B60B 2360/36* (2013.01)

(58) Field of Classification Search
CPC ........ B60B 2310/241; B60B 2310/242; B60B 2360/36; B60B 2360/10; B29C 53/086; B29C 70/04–085; B29C 70/16–228; B29C 70/30–345; B29C 70/38–44; B29C 70/446; B29C 2791/001; B29C 53/40–46; B29C 53/38; B29C 2791/002; B29C 70/00; B32B 5/12; B32B 7/005; B32B 5/06; B32B 5/26; B32B 37/16; B32B 3/26; B32B 38/0012; B32B 5/024; B32B 2605/00; B32B 2307/52; B32B 2305/188; B29B 11/16

See application file for complete search history.

(56) References Cited

U.S. PATENT DOCUMENTS

| | | | |
|---|---|---|---|
| 4,983,240 A | 1/1991 | Orkin et al. | |
| 9,616,704 B2 | 4/2017 | Werner | |
| 9,616,705 B2 | 4/2017 | Burlefinger | |
| 2001/0050282 A1* | 12/2001 | Heath | B29C 63/02 220/62.22 |
| 2005/0104441 A1* | 5/2005 | Bertelson | B29C 70/345 301/64.703 |
| 2008/0234836 A1 | 9/2008 | Taylor | |
| 2012/0100321 A1 | 4/2012 | Goering et al. | |
| 2012/0177501 A1* | 7/2012 | Cairo | C22C 47/20 416/230 |
| 2014/0079895 A1* | 3/2014 | Foster | F04D 29/023 428/34.1 |
| 2014/0333122 A1 | 11/2014 | Werner | |

* cited by examiner

COMPOSITE WHEEL RIM PREFORM AND METHOD OF FABRICATING A COMPOSITE WHEEL RIM PREFORM

CROSS-REFERENCE TO RELATED APPLICATIONS

This application is a divisional application of co-pending U.S. patent application Ser. No. 15/131,917, filed Apr. 18, 2016, which claims priority pursuant to 35 U.S.C. 119(e) to U.S. Provisional Patent Application Ser. No. 62/149,084, filed Apr. 17, 2015, the entire disclosures of which is incorporated herein by reference.

FIELD OF THE INVENTION

The present invention relates generally to composite structures. More specifically, the present invention is concerned with triaxially braided composite preforms.

BACKGROUND OF THE INVENTION

A triaxially braided composite wheel will outperform a biaxially braided composite wheel of the same fiber and matrix for several loading conditions, including lateral impact, radial impact and bolt bearing strength. Consequently, it would be beneficial to have a triaxial braided composite wheel rim. However, challenges associated with the lay-up of triaxial braided composites have limited the use of textiles in composite wheel applications to biaxial braid or weave. In particular, the ability for a braided sheet to be formed around contoured shapes ("drapability"), is greatly decreased for triaxial braided composites over biaxial braided composites. The decreased drapability is due to the addition of circumferential (0 degree) fibers braided between the fibers of equal and opposite angles of biaxial braided composites.

One solution is to wind the fibers together using a "capstan" process in which individual fibers are pulled onto a contoured mandrel as the fibers are being wound together. The capstan process creates a contoured composite braid that corresponds with the contoured mandrel because the individual fibers are capable of being pulled at different rates as the braid is being created. For instance, as fibers are being wound onto a contoured mandrel for a wheel, fibers that correspond with larger radius regions of the wheel are pulled faster than fibers that correspond with smaller radius regions of the wheel.

Although the capstan braiding process has several advantages over other methods of forming triaxial braided composite preforms, the capstan braiding process has critical limitations. For instance, the capstan braiding process is incapable of weaving a radial section, such as radial flange. Consequently, it would be beneficial to have a process of weaving a triaxial braided composite preform that includes one or more radial portion.

SUMMARY OF THE INVENTION

The present invention comprises a composite wheel rim preform and a method of fabricating the same. In some embodiments, at least part of the wheel rim preform is fabricated from triaxial braided composite. In some such embodiments, a composite wheel rim fabricated from the preform includes at least one radial flange.

Referring to FIG. 1, a preferred embodiment of the wheel rim includes a radially oriented auxiliary flange positioned between outer and inner bead flanges. Referring to FIG. 2, other embodiments of the wheel rim do not include a radially oriented auxiliary flange. Both composite wheel rim variants require a composite wheel rim preform of the present invention; however, it will be appreciated that the present invention is not limited to these two wheel rim variants. For example, the present invention also applies to a wheel rim with a bead relief region located toward the inner bead flange, known as a reverse relief rim.

It will be understood that the term preform refers to both the layers of composite material in the desired rim shape and/or the individual pieces which make up the entire preform. In some embodiments, the preforms are pre-cured. In other embodiments, the preforms feature varying materials in their material architecture, such as fiberglass, thermoplastic, metal, carbon fiber, and/or Kevlar. In still other embodiments, at least some tows within the material architecture include multiple materials, for example, carbon fiber and aluminum, Kevlar and fiberglass, and/or fiberglass and epoxy. In yet other embodiments, the material are partially or completely impregnated with a chemical, such as epoxy.

In some embodiments, the composite wheel rim preform includes a braided architecture. More specifically, the preform features a triaxially braided architecture in at least one location. In some such embodiments, the axial fibers of the triaxially braided architecture follow the circumference of the rim and the biased fibers are at an angle bias from the axial fibers. In other such embodiments, the axial fibers of the triaxially braided architecture are generally in line with the central axis of the wheel.

The present invention further includes a method for making a composite wheel rim preform. In some such embodiments, the method includes utilizing a capstan braiding process to create a preform in an intermediate configuration. Referring to FIG. 7 and FIG. 8, some embodiments of the intermediate configuration of the preform include one or more v-section. In some embodiments, the two sides of the v-section are pushed together during the layup of the rim preform so as to form a radially oriented auxiliary flange, thereby moving the preform from an intermediate configuration to a final configuration. In some such embodiments, this method allows a triaxially braided architecture to be utilized in forming a radially oriented auxiliary flange.

In some embodiments, the rim preform is periodically wrapped with a strand material to provide debulking of the composite layers underneath. In other embodiments, strand material is used along the preform width to provide localized thickness or mechanical properties modification, such as at bead humps of the wheel rim. In still other embodiments, strand material is wrapped in at least one location along the preform width in order to help stabilize the preform during layup, such as to fold back edge capping layers and/or edge capping flaps.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

Figure 1:
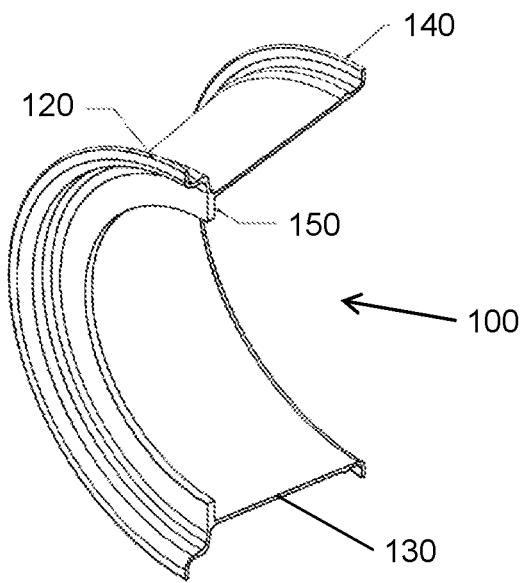
FIG. 1 is a perspective sectional view of a wheel rim that includes a radially oriented auxiliary flange.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention comprises a composite wheel rim preform 10 and a method of fabricating the same. More specifically, the present invention comprises a wheel rim preform 10 that is fabricated at least partially from triaxial braided composite material in such a way so as to enable production of a triaxial braided composite wheel 100 that includes at least one radial flange.

Referring to FIGS. 1-4, a preferred embodiment of a wheel rim preform 10 of the present invention is capable of being utilized to form a composite wheel rims 100. In preferred embodiments, the wheel rim 100 includes opposed outer 120 and inner 140 portions that are configured to selectively interface with respective outer and inner beads of a tire (not shown) so as to accommodate pressurizing an internal volume of the tire. In some embodiments, the wheel rim 100 includes a lateral portion 130, such as a continuous wall 130 extending between the outer 120 and inner 140 portions. In other embodiments, the outer 120 and inner 140 portions each define respective outer 124 and inner 144 bead seat regions that are configured to receive respective outer and inner beads of the tire. In some such embodiments, the outer 120 and inner 140 portions of the wheel rim 100 further include respective outer 122 and inner 142 bead flanges that are configured so as to prevent and/or otherwise inhibit respective outer and inner beads of the tire from sliding out of their respective outer 124 and inner 144 bead seat regions, such as when the tire is pressurized. In other such embodiments, the outer 120 and inner 140 portions of the wheel rim 100 further include respective outer 126 and inner 146 bead humps that are configured so as to prevent and/or otherwise inhibit respective outer and inner beads of the tire from sliding out of their respective outer 124 and inner 144 bead seat regions, such as when the tire is not pressurized.

In some embodiments, the outer 122 and inner 142 bead flanges are radially oriented flanges that extend radially outward at or near respective outer and inner edges of the wheel rim 100. In some such embodiments, a generally axially oriented outer return flange 125 extends axially outward from a distal edge of the outer bead flange 122 such that the outer return flange 125 extends away from the outer bead seat region 124. In other such embodiments, a generally axially oriented inner return flange 145 extends axially inward from a distal edge of the inner bead flange 142 such that the inner return flange 145 extends away from the inner bead seat region 144.

In some embodiments, the outer bead seat region 124 extends axially inward from a proximal edge of the outer bead flange 122. In some such embodiments, the outer bead hump 126 forms an inner edge of the outer bead seat region 124. In other embodiments, the inner bead seat region 144 extends axially inward from a proximal edge of the inner bead flange 142. In some such embodiments, the inner bead hump 146 forms an outer edge of the inner bead seat region 144.

In some embodiments, the outer portion 120, the lateral portion 130, and the inner portion 140 of the wheel rim are all formed at least partially from a plurality of continuous composite layers 41 extending from the lateral portion 130 into each of the outer 120 and inner 130 portions. In some such embodiments, at least some of the continuous composite layers 41 extend from a distal edge of the outer bead flange 122 into the lateral portion 130. In other such embodiments, at least some of the continuous composite layers 41 extend from a distal edge of the inner bead flange 142 into the lateral portion 130. In still other such embodiments, at least some of the continuous composite layers 41 extend from a distal edge of the outer bead flange 122, through the lateral portion 130, to a distal edge of the inner bead flange 142. In some embodiments, the wheel rim 100 includes one or more auxiliary flange 150. In some such embodiments, at least some of the continuous composite layers 41 extend from the lateral portion 130 into the auxiliary flange 150. In other such embodiments, the auxiliary flange 150 is oriented in a radial configuration such that it is generally perpendicular to the lateral section 130. In still other such embodiments, the auxiliary flange 150 is formed as part of the lateral section 130.

Figure 2:
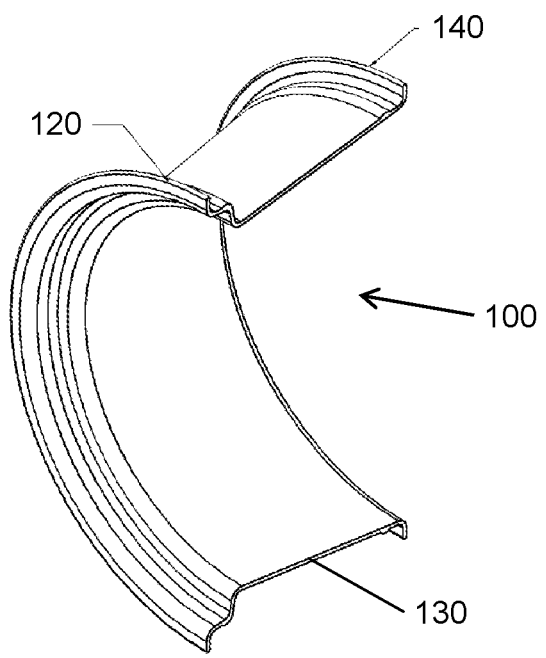
FIG. 2 is a perspective sectional view of a wheel rim that does not include an auxiliary flange.

Referring to FIG. 1, a preferred embodiment of the wheel rim 100 includes a radially oriented auxiliary flange 150. In some such embodiments, the auxiliary flange 150 extends radially inward. In other embodiments, the auxiliary flange 150 is positioned between the outer 122 and inner 142 bead flanges. Referring to FIG. 2, other embodiments of the wheel rim 100 do not include an auxiliary flange 150.

Figure 3:
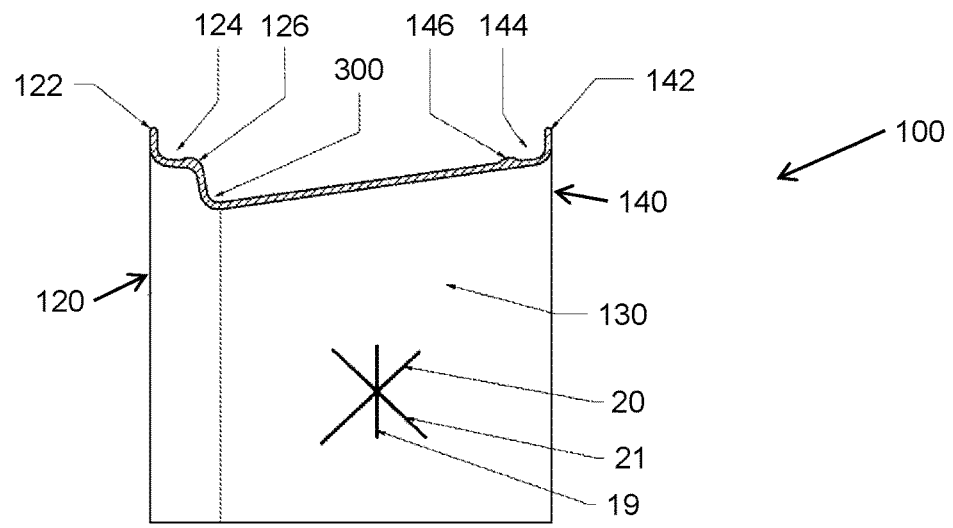
FIG. 3 is a front sectional view of a wheel rim that does not include an auxiliary flange. The view includes a graphical representation of the fiber orientations for one embodiment of the present invention.
Figure 4:
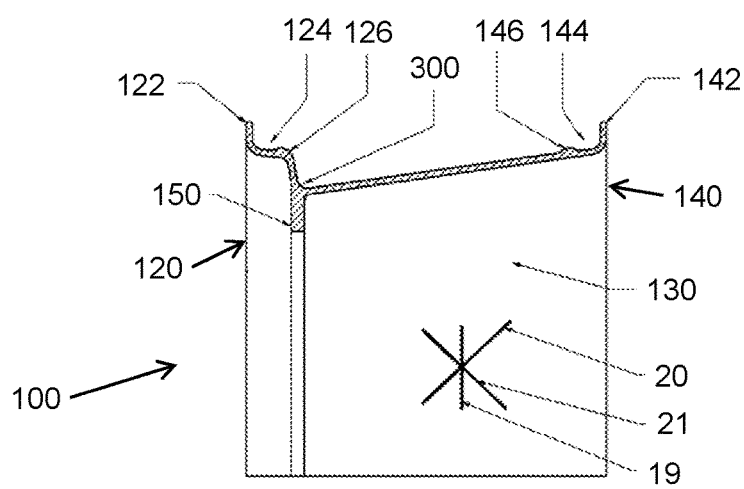
FIG. 4 is a front sectional view of a wheel rim that includes a radially oriented auxiliary flange. The view includes a graphical representation of the fiber orientations for one embodiment of the present invention.

Referring to FIG. 3 and FIG. 4, the wheel rim 100 includes outer 124 and inner 144 bead seat regions adjacent to respective outer 122 and inner 142 bead flanges. The outer 124 and inner 144 bead seat regions are configured to receive respective outer and inner beads of a tire. In some embodiments, the wheel rim 100 further includes outer 126 and inner 146 bead humps. In some such embodiments, each bead hump is a retention device that is configured to retain a respective tire bead of the tire in a respective bead region 124, 144 of the wheel rim 100 during use, such as during cornering. In other embodiments, the wheel rim 100 includes a bead relief region 300 that creates a recess so the tire can be mounted onto the wheel rim 100. In some such embodiments, the bead relief region 300 is formed at least partially from and/or is positioned adjacent to the outer portion 120 of the wheel rim 100. In other embodiments, the bead relief region 300 is formed at least partially from and/or is positioned adjacent to the inner portion 140 of the wheel rim 100. In still other embodiments, the bead relief region 300 is formed at least partially from the lateral portion 130 of the wheel rim 100 and/or is formed at an interface between the outer 120 and inner 140 portions, such as for some embodiments having a drop center region.

Figure 6:
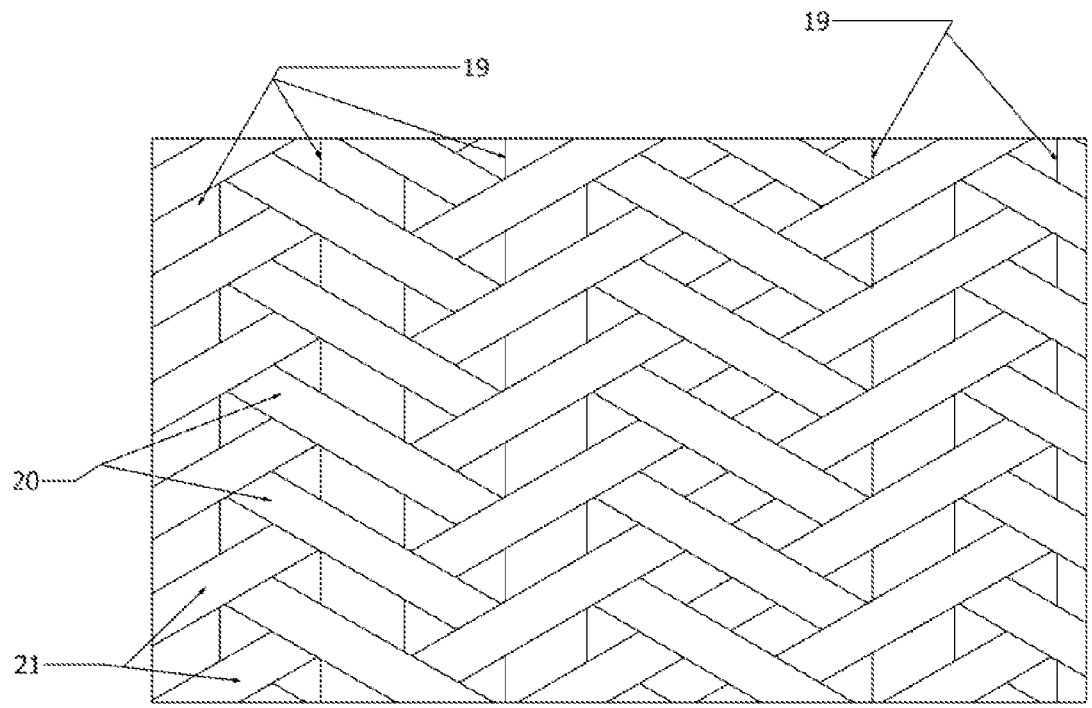
FIG. 6 is an enlarged scale view of composite material of a preferred embodiment of the present invention.

Referring to FIGS. 3, 4, and 6, some embodiments of the present invention include a triaxially braided architecture. In some such embodiments, axial fibers 19 of the triaxially braided architecture follow a circumference of the wheel rim preform 10 and biased fibers 20, 21 are at an angle bias from the axial fibers 19. In other such embodiments, the axial fibers 19 of the triaxially braided architecture are generally in line with a central axis of the wheel rim preform 10. It will be appreciated that, in other embodiments, the fibers have different orientations. It will be further appreciated that, in still other embodiments, the fibers will be oriented in more than three directions such that the architecture is not a triaxially braided architecture.

Figure 5:
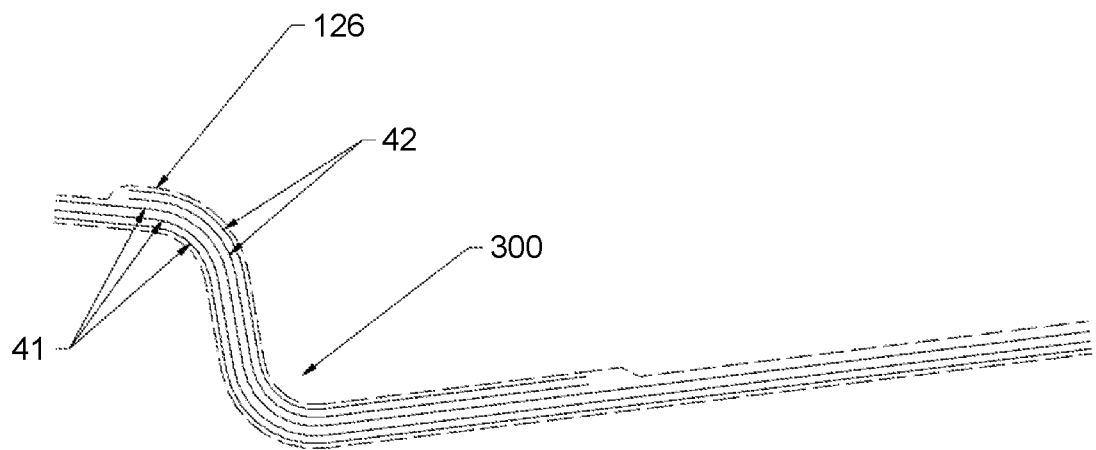
FIG. 5 is a cross sectional view of a bead relief region of a wheel rim fabricated from a preform of the present invention.

Referring to FIG. 5, some embodiments of a bead relief region 300 of a wheel rim 100 formed from the preform 10 of the present invention include one or more main layer 41 and one or more bridge layer 42. Some such bead relief regions 300 create an undulation in the rim's shape so as to facilitate mounting a tire onto the wheel rim 100. In some embodiments, an undulation in a rim's shape decreases the structural efficiency of the rim 100 at or near the undulation. In some such embodiments, the wheel rim 100 includes one or more bridge layer 42 for additional reinforcement at or near an undulation. In some embodiments, the one or more bridge layer 42 extends to one or more outer bead hump 126 such that an edge of one or more of the one or more bridge layers 42 also provides at least some of the necessary increase in thickness at the outer bead hump 126. In other embodiments, at least one bridge layer 42 is longer than at least one other bridge layer 42. For example, in some such embodiments, an outermost bridge layer 42 is longer than the other bridge layers 42 such that the outermost bridge layer 42 covers the edges of each of the other bridge layers 42. In some such embodiments, the outer bridge layer 42 and/or some other bridge layer 42 extends over the entire width of the wheel rim preform 10 so as to cover the entire width of the wheel rim 100.

Referring to FIG. 6, some embodiments of the triaxially braided material architecture of the preform 10 includes a plurality of axial fibers 19 (also known as tows) and bias fibers 20, 21. In some such embodiments, the size and/or number of tows 19 in each unit cell of the braid architecture is varied to provide varying thickness, varying mechanical properties, and/or varying drapability within the composite wheel rim preform 10. For example, where additional thickness is required, larger tows 19 and/or multiple tows 19 are braided into one of the braid's axial positions. In some embodiments, this technique is used in the bead seat regions 124, 144 of the preform to increase the thickness of the composite material under the tire bead. In other embodiments, smaller tows 19 and/or fewer tows 19 are braided into the braid's axial positions so as to decrease the thickness of the composite material in other regions. In still other embodiments, such as is shown in FIG. 6, at least one of the unit cells does not include an axial fiber 19 at all. In this way, the localized thickness of the preform 10 is reduced and/or drapability of the braid is enhanced.

Figure 8:
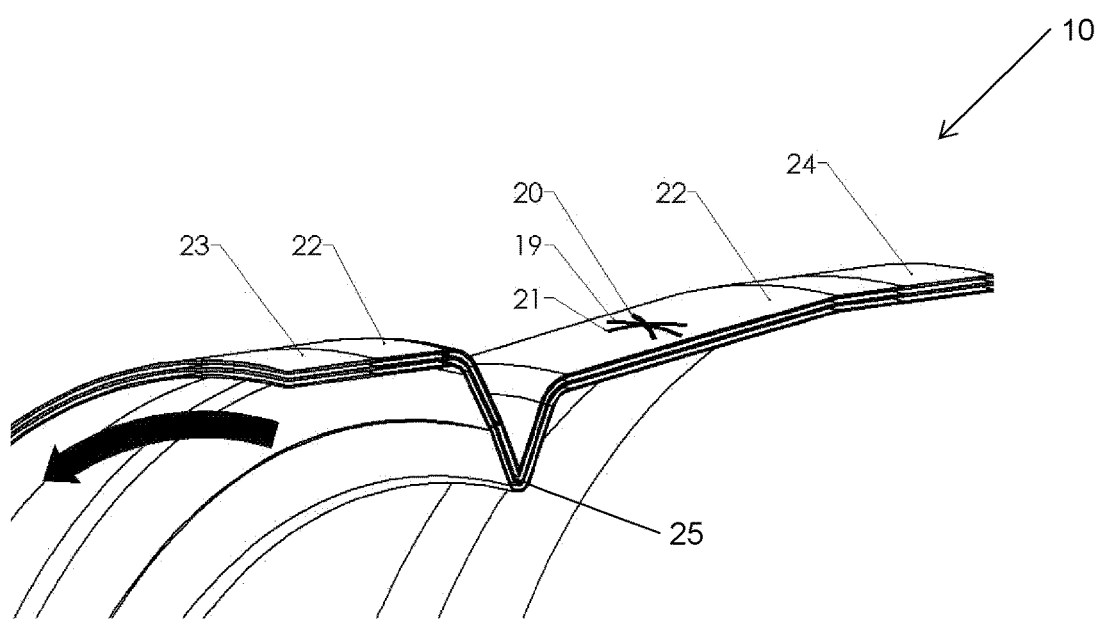
FIG. 8 is a perspective sectional view of a preform of the present invention shown in an intermediate configuration, the preform including an auxiliary section shown in an angled configuration.

Referring to FIG. 8, the braided material of some embodiments of the present invention include regions with varying architecture. In some such embodiments, a main section 22 of the wheel rim preform 10 includes a triaxially braided architecture. In other such embodiments, an outer 23 and/or inner 24 end of the wheel rim preform 10 includes a biaxially braided architecture. In this way, the drapability of the material is improved in areas in which improved drapability is required and/or desired. For instance, in some such embodiments, improved drapability is required and/or desired for forming one or more radially oriented bead flange 122, 142 of a wheel rim 100 and/or for allowing cap flaps 520, 540 extending from respective ends of the preform 10 to be folded back toward the center of the preform 10 so as to effectively cap the edges of the preform 10, thereby facilitating the creation of capped bead flanges 122, 142 and/or capped return flanges 125, 145 of a wheel rim 100. In some embodiments, the preform defines a plurality of inner 520 and/or outer 540 cap flaps. In some such embodiments, a plurality of radial slits 500 extends between adjacent cap flaps 520, 540 so as to accommodate folding the adjacent cap flaps back over the rest of the preform without having any portion of any of the cap flaps 520, 540 laying on top of any portion of an adjacent cap flap 520, 540.

In preferred embodiments, the main section 22 comprises a generally lateral configuration. In some embodiments, the main section 22 is a single section of the preform 10. In other embodiments, the main section 22 is broken into several pieces and/or sections. In some such embodiments, the main section 22 is broken by one or more crease and/or fold line. In other such embodiments, the main section 22 is broken by one or more secondary section. In various such embodiments, one or more layer of composite material 41 extends from the main section 22 into the secondary section. In some such embodiments, the piece of composite material 41 extends from one portion of the main section 22, through the secondary section, and into another portion of the main section 22.

In some embodiments, at least some of the composite layers 41 are folded against each other such that the secondary section comprises first and second radial portions. In some such embodiments, the first and second radial portions of the secondary section are capable of forming first and second radial portions of an auxiliary flange 150 of the wheel rim 100, with the first radial portion being formed from a portion of the composite material 41 that extends towards a distal end 152 of the auxiliary flange 150 and the second radial portion being formed from a portion of the composite material 41 that extends away from the distal end 152 of the auxiliary flange 150. In some embodiments, at least some of the composite layers 41 are folded back over themselves again so as to extend between the first and second radial portions of the secondary section such that the auxiliary flange 150 further comprises a third radial portion and/or such that a distal end of the composite layers 41 is entrapped between the first and second radial portions of the auxiliary flange 150.

In some embodiments, the secondary section is moveable from an angled configuration to a radial configuration. In some such embodiments, the secondary section is in the angled configuration when the preform 10 is in an intermediate configuration. In other such embodiments, the secondary section is in the radial configuration when the preform 10 is in a final configuration. In some embodiments, the secondary section is generally perpendicular to the main section 22 when the secondary section is in the radial configuration. In some embodiments, the secondary section is an end section 23, 24 that is capable of forming at least part of a bead flange 122, 142 of the wheel rim 100. In other embodiments, the secondary section is an auxiliary section 25 that is capable of forming at least part of an auxiliary flange 150 of the wheel rim 100.

Figure 7:
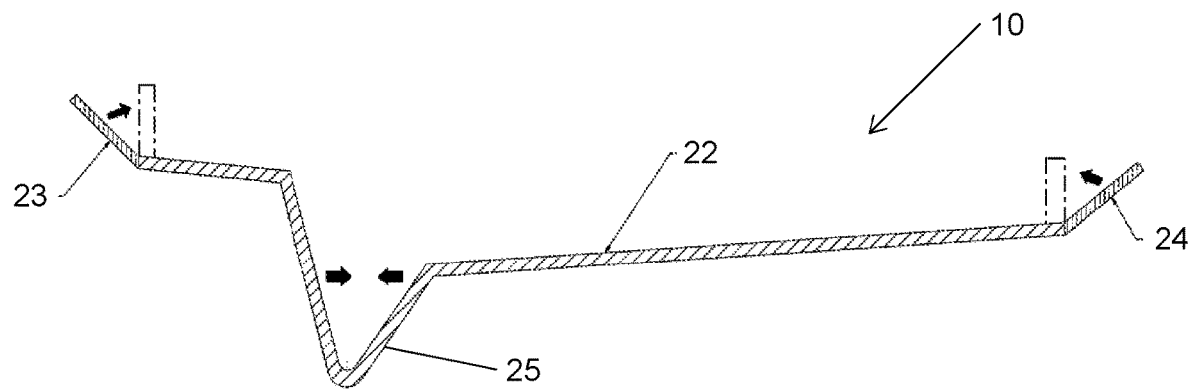
FIG. 7 is a cross sectional view of a preform of the present invention shown in an intermediate configuration, the preform including an auxiliary section shown in an angled configuration and two end sections shown in respective angled configurations. The sectional view further shows arrows indicating movement of the auxiliary and end sections to their respective radial configurations. The sectional view still further shows an outline of a radial configuration for each end section.

The present invention further includes a method for making a preform 10 for a composite wheel rim 100. In some such embodiments, the method includes utilizing a capstan braiding process to create the preform 10 in an intermediate configuration. Referring to FIG. 7 and FIG. 8, some embodiments of the preform 10 include one or more auxiliary section 25 in an angled configuration when the preform 10 is in the intermediate configuration. In some such embodiments, the auxiliary section comprises a v-section when it is in the angled configuration. In some embodiments, the preform 10 is moved to a final configuration by pushing the two sides of the v-section together, thereby closing the v-section and moving the auxiliary section to a radial configuration. In some such embodiments, this method allows a triaxially braided architecture to be utilized in forming a radially oriented auxiliary flange 150 of a wheel rim 100.

Referring again to FIG. 7, some embodiments of the preform 10 include one or more end section 23, 24 in an angled configuration when the preform 10 is in the intermediate configuration. In some embodiments, the end sections 23, 24 are rotated upwards to a radial configuration. In this way, the end sections 23, 24 are capable of forming bead flanges 122, 142 of a wheel rim 100. Accordingly, the bead flanges 122, 142 are capable of being formed from triaxially braided material architecture. As a result, the one or more bead flanges 122, 142 have increased impact performance properties compared with equivalent bead flanges that are formed from biaxially braided material architecture. In still other embodiments, additional material extending past a portion of the end sections 23, 24 that forms the bead flanges 122, 142 of the wheel rim 100 is capable of being folded over and back toward the center of the preform 10. In some such embodiments, the additional material is biaxially braided to allow drapability. In other such embodiments, the additional material is triaxially braided. In some such embodiments, the additional triaxially braided material is initially formed as a declining surface.

Figure 9:
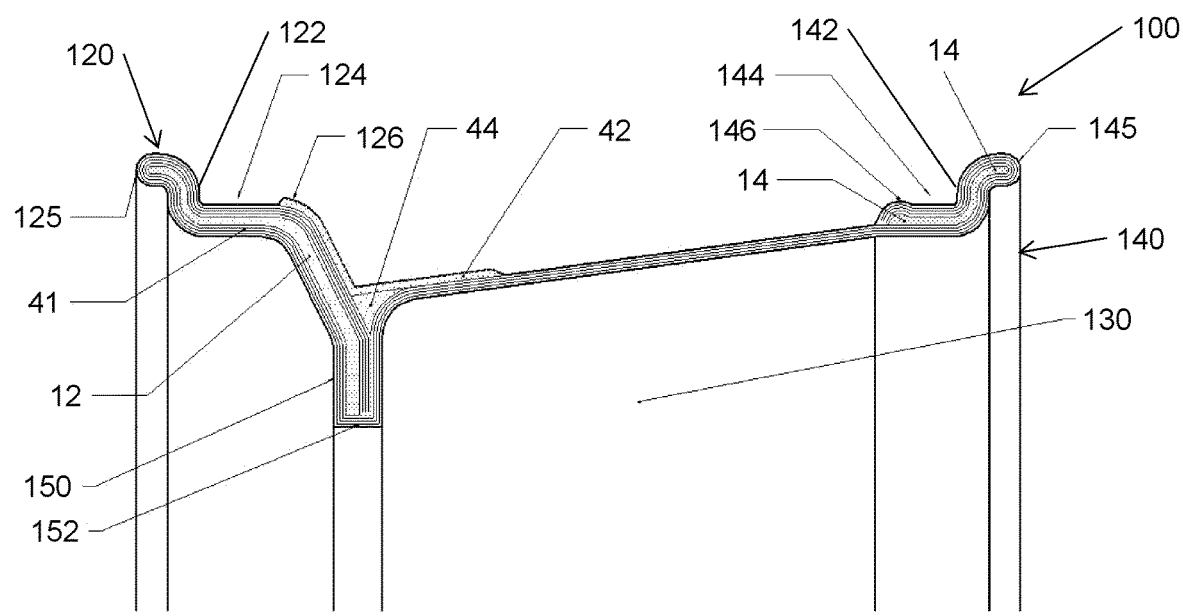
FIG. 9 is a front sectional view of a wheel rim fabricated from a preform of the present invention.
Figure 10:
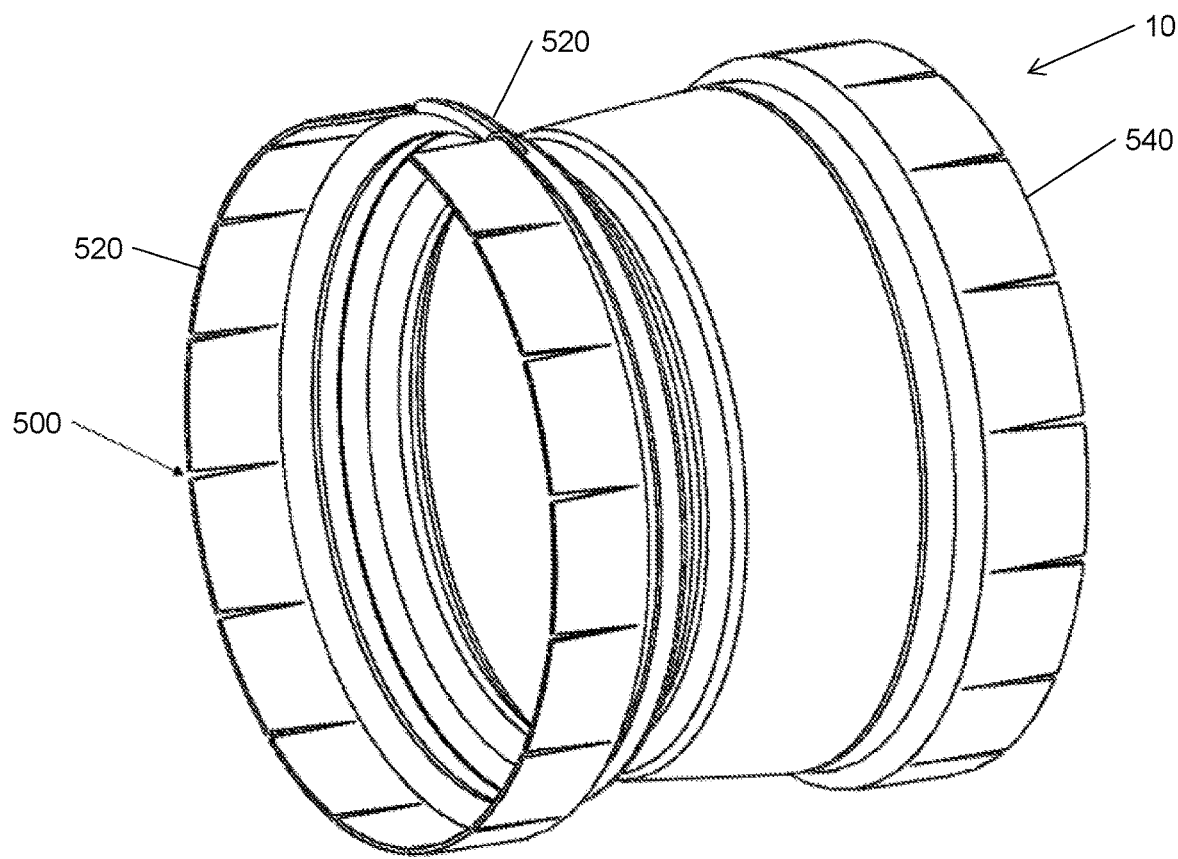
FIG. 10 is a perspective view of a preform of the present invention, the preform including a plurality of edge capping flaps.

Referring to FIG. 9, some embodiments of the present invention include an assembled preform 10 for a composite wheel rim 100 that includes a radially oriented auxiliary flange 150. In some embodiments, one or more preform layer 41, such as layers forming one or more cap flap 520, 540, is folded back toward the center of the preform 10 so as to fully cap the edges of the preform 10. In some such embodiments, the folded back layers extend into a v-section of an auxiliary section 25. For instance, in some such embodiments, one or more outer cap flap 520 is folded back when the preform 10 is moved from an intermediate configuration such that a distal edge of the outer cap flap 520 nests in a bottom of the v-section. In this way, the distal edge of the outer cap flap 520 is trapped between the opposed sides of the v-section when the preform 10 is moved to a final configuration by rotating the opposed sides of the v-section against respective opposed surfaces of the outer folded back layers. In this way, the one or more outer cap flap 520 is capable of forming part of an auxiliary flange 150 of a wheel rim 100. It will be appreciated, however, that in other embodiments, the one or more cap flap 520, 540 is shorter in length. For example, as shown in FIG. 9, one or more inner cap flap 540 does not extend into the v-section at all in some embodiments. In some such embodiments, as shown in FIG. 9, the one or more inner cap flap 540 is capable of forming part of an inner bead flange 142 of a wheel rim 100.

Still referring to FIG. 9, additional reinforcement preforms are placed, as necessary, in some embodiments and are omitted entirely from other embodiments. In some embodiments having reinforcement preforms, an outer 12 and/or inner 14 buildup preform covers as little as just a respective bead flange of the wheel rim 100, as much as the entire width of the rim 100, or just the respective inner 140 or outer 120 portions of the wheel rim 100. In other embodiments, the outer 12 and/or inner 14 buildup preforms are removed. In still other embodiments, one or more buildup preform includes a braided, fabric, and/or tape architecture and/or includes a composite strand. In some embodiments, the main layers 41 of the preform material are the full width of the preform 10, such as shown in FIG. 9. In other embodiments, the main layers 41 of the preform material are separated into multiple preform material sections. In some such embodiments, the main preform material 41 is split into two preforms at an auxiliary flange 150 of a wheel rim 100 fabricated from the preform 10. In some such embodiments, the preform material 41 is braided full width and slit to separate the preforms into multiple sections.

Still referring to FIG. 9, some embodiments of the present invention include one or more bridge layer 42 and/or one or more gap filler 44. In some such embodiments, the one or more gap filler 44 is positioned within a gap between the one or more bridge layer 42 and a portion of the wheel rim preform. In some embodiments, the length of the one or more bridge layer 42 is longer than the length of the one or more bridge layer of another embodiment. In other embodiments, the gap filler 44 is fabricated from any material, but preferably from a carbon fiber tow, a braided carbon fiber, or a polyurethane foam.

FIG. 9 shows a preferred embodiment that includes a rim preform 10 that is capable of being utilized to manufacture a wheel rim 100 featuring a return flange 125, 145 at each bead flange 122, 142 of the wheel rim 100. It will be appreciated, however, that the present invention can be applied to any edge arrangement, including a "Euro-style" flange which does not feature an axially oriented return flange.

In preferred embodiments of the present invention, the method of fabricating a composite preform 10 includes forming the preform 10 in an intermediate configuration and moving it to a final configuration. In some embodiments, the preform 10 includes a main section 22 and at least one secondary section, the secondary section being moveable between an angled configuration and a radial configuration. In some such embodiments, the secondary section is in the angled configuration when the preform is in the intermediate configuration. In other such embodiments, the secondary section is in the radial configuration when the preform is in the final configuration. In still other such embodiments, the main section 22 has a generally lateral configuration. In yet other such embodiments, the secondary section is generally perpendicular to the main section when the secondary section is in the radial configuration.

In some embodiments, the secondary section is an auxiliary section 25. In some such embodiments, the auxiliary section 25 forms an open v-section when the auxiliary section 25 is in the angled configuration. In other such embodiments, moving the auxiliary section 25 to the radial configuration comprises closing at least part of the v-section. In some such embodiments, the auxiliary section 25 is configured so as to be capable of forming at least part of an auxiliary flange 150 of a wheel rim 100 when the auxiliary section 25 is in the radial configuration.

In some embodiments, the secondary section is an end section 23, 24. In some such embodiments, the end section 23, 24 extends from an edge of the main section 22. In other such embodiments, the end section 23, 24 is configured so as to be capable of forming at least part of an outer 120 or inner 140 portion and/or at least part of one or more cap flap 520, 540. In some embodiments, one or more cap flap is formed by cutting one or more radial slit 500.

In some embodiments, moving the end section 23, 24 from the angled configuration to the radial configuration comprises rotating a proximal portion of the end section 23, 24 so as to be generally perpendicular with the main section 22. In this way, the proximal portion of the end section 23, 24 is capable of forming at least part of a bead flange 122, 142. In other embodiments, moving the end section from the angled configuration to the radial configuration further comprises rotating a mid-portion and/or a distal portion of the end section 23, 24 so as to be generally perpendicular with the proximal portion of the end section 23, 24. In this way, the mid and/or distal portion of the end section 23, 24 is capable of forming at least part of a return flange 125, 145 of the wheel rim 100. In still other embodiments, a distal portion of the end section 23, 24 forms at least one cap flap 520, 540. In some such embodiments, the method further includes folding the cap flap 520, 540 over the mid and/or proximal portion of the end section 23, 24. In this way, the end section 23, 24 is capable of forming a capped bead flange 122, 142 and/or a capped return flange 125, 145.

In some embodiments, the present invention further includes forming a preform from a plurality of composite layers. In some such embodiments, at least some of the composite layers are custom composite layers. In some embodiments, a custom composite layer comprises a plurality of axial fibers that are interwoven intermittently with first and second sets of biased fibers. In some such embodiments, the first and/or second set of biased fibers are substantially consistent throughout all or part of the custom composite layer.

In some embodiments, custom composite layers include one or more low-density region. In this way, in some embodiments, the custom composite layer provides for better drapability and/or otherwise improves the method of forming the preform of the present invention. In some embodiments, such as shown in FIG. 6, a low-density region is a region of the custom composite layer in which one or more axial fiber has been omitted. In some such embodiments, the custom composite layer is biaxial in the low-density region and triaxial throughout the rest of the custom composite layer. In other such embodiments, the spacing between axial fibers is larger in the low-density region than it is in other regions of the custom composite layer. In still other such embodiments, one or more axial fiber in the low-density region is smaller, more flexible, and/or otherwise less restrictive to flexing than are other axial fibers outside of the low-density region.

In some embodiments, custom composite layers include one or more high-density region. In this way, in some embodiments, the custom composite layer provides for increased strength and/or increase thickness as required and/or desired. In some embodiments, a high-density region is a region of the custom composite layer in which one or more axial fiber is larger, stronger, and/or otherwise less susceptible to flexing and/or deforming than are other axial fibers outside of the high-density region. In some such embodiments, the high-density region is defined by axial fibers placed closer together than they are in other regions of the custom composite layer. In some such embodiments, two or more axial fibers are placed together in a high-density region where a single fiber would normally be utilized outside of the high-density region.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A composite preform for a composite wheel rim, the preform comprising a plurality of composite layers, at least some of the composite layers being custom composite layers having a plurality of axial fibers having an axial orientation being interwoven intermittently with a first set of biased fibers having a first biased orientation offset from the axial orientation and a second set of biased fibers having a second biased orientation offset from the axial orientation and the first biased orientation and wherein at least one custom composite layer defining a low-density region, said low-density region being defined by at least one of an omitted axial fiber within said low-density region or an undersized axial fiber within said low-density region and wherein at least one custom composite layer defines a high-density region, said high density region being defined by an oversized fiber within said high density region.

2. The composite preform of claim 1, wherein said low-density region being defined by said omitted axial fiber.

3. The composite preform of claim 1, wherein said oversized fiber is an oversized axial fiber within said high-density region.

4. The composite preform of claim 1, wherein at least one of the axial fibers is fabricated from a metallic material.

5. The composite preform of claim 1, wherein the axial orientation is generally perpendicular to a central axis of the wheel rim such that the axial fibers generally follow a circumference of the wheel rim.

6. The composite preform of claim 1, wherein the axial orientation is generally parallel with a central axis of the wheel rim such that the axial fibers are generally in line with the central axis of the wheel rim.

7. The composite preform of claim 1, wherein the preform comprises:
a main section in a generally lateral configuration; and
a secondary section in a radial configuration,
wherein the secondary section extends generally perpendicularly from the main section,
wherein the main section and the secondary section are formed at least partially from a custom composite layer extending from the main section into the secondary section, and
wherein the custom composite layer comprises at least one of a low-density region or a high-density region.

8. The composite preform of claim 1, wherein said high-density region includes additional fibers.

9. The composite preform of claim 1 wherein the axial orientation of at least one of the axial fibers is selected from the group consisting of axial fibers generally following a circumference of the wheel rim wherein the axial orientation is generally perpendicular to a central axis of the wheel rim, or axial fibers generally in line with the central axis of the wheel rim wherein the axial orientation is generally parallel with said central axis of the wheel rim.

10. The composite preform of claim 1 wherein said low-density region being defined by said undersized axial fiber within said low-density region.

11. The composite preform of claim 1 wherein said high oversized fiber is at least one of said plurality of axial fibers.

12. The composite preform of claim 8 wherein said additional fibers are axial fibers.

13. The composite preform of claim 1 wherein said low-density region is defined by an undersized axial fiber.

* * * * *